Figure 1:
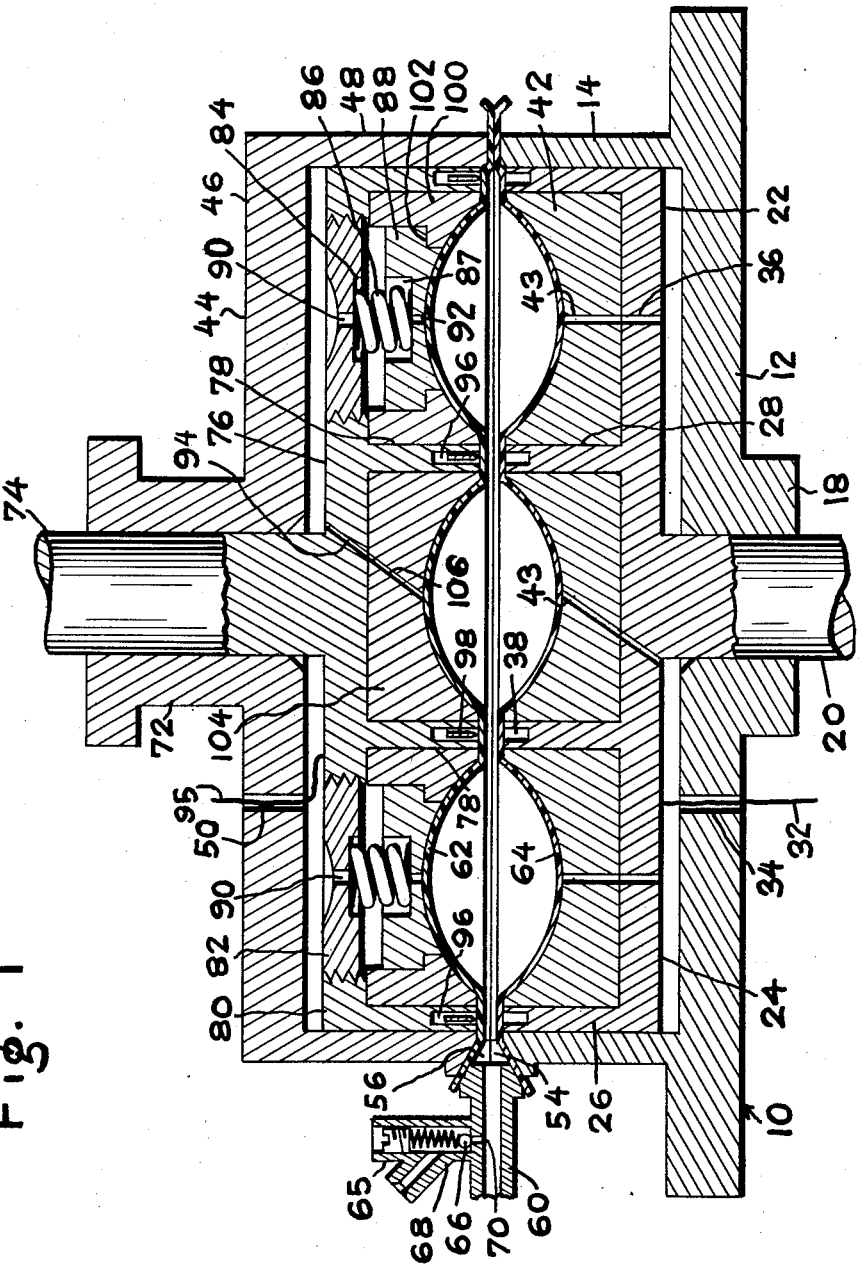

Sept. 8, 1959 H. LANG 2,902,808
APPARATUS FOR FORMING SEAMLESS PACKAGES FOR FLUIDS
Filed March 9, 1954 2 Sheets-Sheet 1

INVENTOR.
HELMUTH LANG
BY Connally & Hutz
HIS ATTORNEYS

Sept. 8, 1959  H. LANG  2,902,808
APPARATUS FOR FORMING SEAMLESS PACKAGES FOR FLUIDS
Filed March 9, 1954  2 Sheets-Sheet 2
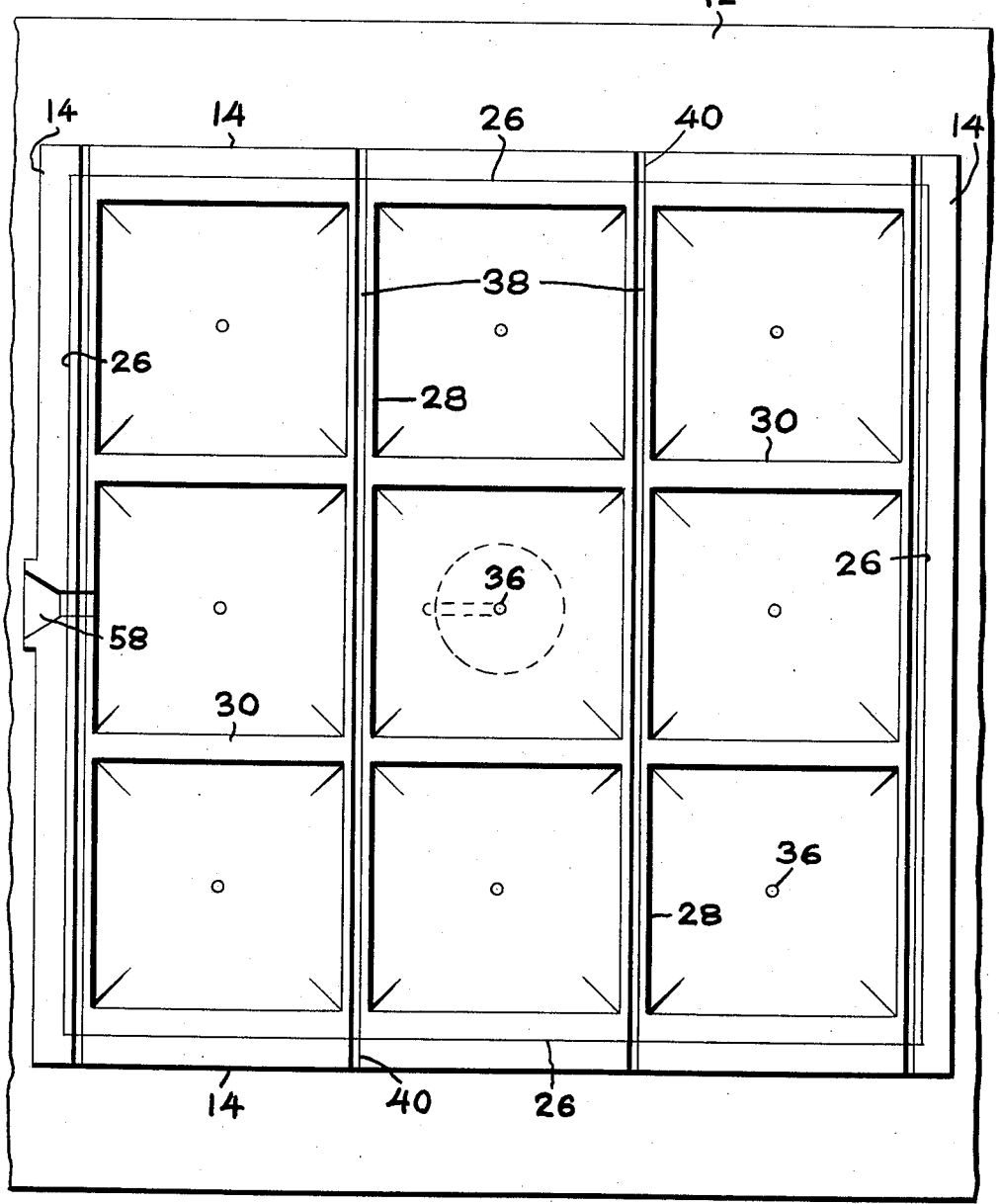
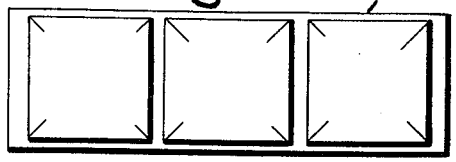
INVENTOR.
HELMUTH LANG
BY *Connally + Hutz*
HIS ATTORNEYS

United States Patent Office 2,902,808
Patented Sept. 8, 1959

2,902,808

APPARATUS FOR FORMING SEAMLESS PACKAGES FOR FLUIDS

Helmuth Lang, Hochberg, near Siegsdorf, Wernleiten, Germany, assignor to Farbwerke Hoechst Aktiengesellschaft vormals Meister Lucius & Brüning, Frankfurt am Main Hochst, Germany, a company of Germany Application March 9, 1954, Serial No. 415,091

Claims priority, application Germany March 12, 1953

6 Claims. (Cl. 53—180)

This invention relates to a method and apparatus for packaging fluid or viscous substances in flexible plastic casings, these casings being produced from a pair of strips, or the like, the edges of which are welded or heat sealed around the contents.

It has been previously known to fill seamless tubes with fluid or viscous substances and then subdivide the tubes into individual packages by sealing portions of the tube along its length in the manner of a sausage. However, all previous methods for accomplishing this purpose could not produce packages of uniform dimensions and capable of holding a uniform amount of material. Furthermore, all these previous methods required the use of complex apparatus and the constant attendance of at least several workmen.

According to the present invention the individual casings are formed, filled and then either completely or partially cut out from a pair of superimposed flat strips or from a strip containing preformed pockets; all this being accomplished in a single device. This device, which generally comprises upper and lower molds, permits the filling of each casing with absolutely equal amounts, both in regard to the volume and weight. By suitably selecting the proper material for the inner lining of the molds it is possible to package dielectric materials, such as oil-impregnated graphite, without difficulty.

The molds comprise generally cup-shaped outer clamping members movable toward and away from each other and the peripheral rims of which are adapted to contact each other, and inner electrodes, having a grid network on their faces, movable with the outer clamping members and also individually movable relative to each other. The inner electrodes are provided with die members between the grids which are contoured to fit the shape of the finished article. The inner electrodes are each connected to a source of high frequency voltage such as an oscillator or the like for the production of heat for the welding process.

While the inner and outer molds are spaced apart from each other, the two strips from which the casings are formed are introduced between the electrodes. The outer clamping members are then brought into face to face contact carrying the inner electrodes therewith. At this point, although the outer clamping members are in face to face contact, the inner electrodes are still somewhat spaced apart from each other. Coinciding cut-out portions on the outer members provide a filling opening when the members are in contact, and through this filling opening the filling material is inserted between the two strips. The inner electrodes are then brought together and high frequency voltage is applied, the heat resulting from the voltage acting to seal the edges of the individual packages formed between the grids of the inner electrodes. Cutting means are provided on the inner electrodes so that, after the individual packages are formed, these cutting means can be actuated to detach them from each other.

It is one object of this invention, therefore, to easily and quickly form a plurality of sealed packages containing fluid or viscous material therein.

Another object of this invention is to provide simple and efficient apparatus for accomplishing the above purpose.

Other objects and many of the attendant advantages of this invention will be readily appreciated as the same becomes better understood by reference to the following detailed description when considered in connection with the accompanying drawings wherein:

Fig. 1 is a partly sectional and partly elevational fragmentary view of the molding apparatus, Fig. 2 is a top plan view of the bottom section of the apparatus shown in Fig. 1, and Fig. 3 is a top plan view of a strip of formed packages.

Referring in greater detail to the drawings wherein similar reference characters refer to similar parts, there is shown in Fig. 1 a lower clamping member generally designated 10 comprising a base plate 12 and an upstanding rim portion 14. A central bearing 18 is provided on the base plate 12 and through the opening in this bearing extends a shaft 20.

The shaft 20 is connected to an actuating means, not shown, for moving the shaft vertically; integrally mounted on the shaft is an electrode generally designated 22. The electrode 22 comprises a base 24 and an upstanding peripheral flange 26. Within the confines of the flange 26, a plurality of parallel ribs or flanges 28 extend across the length of the base plate 24 and a plurality of ribs or flanges 30 extend across the width of the base plate, whereby a gridwork is formed. Lead wires 32 extend from the electrode 22 to a source of high frequency.

Vent openings 34 are provided in the base plate 12 of the member 10 and similar vent openings 36 are provided for each pocket formed by the gridwork of the electrode 22, for a purpose to be subsequently more fully set forth. Additionally, longitudinal grooves 38 are formed in the ribs 28 which coincide with slots 40 in the flange 14 of the electrode 10. The purpose of these grooves and slots will also subsequently be set forth.

Within the pockets, formed on the electrode 22 by the gridwork, are provided filler members 42. These members 42 are each provided with a contoured top surface conforming to the desired configuration of the article to be formed. Vent holes 43 are provided in each filler member 42 to coincide with the vent holes 36. The filler members are constructed of any desirable material. However, where such dielectric materials as oil-impregnated graphite are to be packaged, the filler members are preferably made of a dielectric material. On the other hand, the filler members may be made of metal having engraving thereon, either raised or depressed, corresponding to any indicia which it may be desired to impose on the packages. In this manner, during the heating step, the indicia may be directly applied to the packages from the filler members. Alternately, the indicia may be applied to the strips forming the casings of the packages before they are inserted in the machine; in which case, no engraving is necessary on the filler members.

The top mold section is formed of an outer clamping member 44 having a base plate 46 and a peripheral flange 48 which is adapted to mate with the flange 14. This clamping member is provided with vent holes 50 and lead wires 52 similarly to the lower clamping member. Cut out portion 54 on the flange 14 of the lower clamping member and cut out portion 56 on the flange 48 of the upper clamping member mate to form a filling opening 58 at one side of the device.

A filling nozzle generally designated 60 is adapted to be inserted within the opening 58 for the purpose of extruding the filling material between the strips which are indicated at 62 and 64. This nozzle 60 is provided with a relief valve 65 in the form of a spring pressed ball 66 in a housing 68, the valve being in communication with the nozzle through an opening 70.

The member 44 is provided with a central bearing 72 through which extends a shaft 74 similar to shaft 20 and likewise connected to an actuating means for moving it toward and from the lower clamping member. Integrally mounted at the end of the shaft 74 is a cup-shaped electrode 76 similar to the electrode 22. Ribs 78 are provided on the electrode 76 similar to the ribs 28 on the lower electrode 22. Although not shown, cross ribs similar to the cross ribs 30 are also provided on the electrode 76 whereby a grid network is formed. On the base plate 80 of the electrode 76 a plurality of internally threaded openings are provided, one for each pocket formed by the grid network thereof, except the central pocket. Threadedly insertable within each of these openings is an insert 82. A recess 84 is provided at the bottom of each of these inserts and a spring 86 is positioned between this recess and a recess 87 formed in a buffer member 88. The bottom surface of this buffer member 88 is provided with a contour determined by the required configuration of the article to be formed. Vent openings 90 are provided in the inserts 82 and vent openings 92 are provided in the buffer members 88. Diagonal vent opening 94 is provided for the central pocket. Although no spring buffer means, such as illustrated for the other pockets, is shown for the central pocket, such means may be provided by slightly altering the construction of the device at this point. The electrode 76 is connected by leads 95 to a source of high voltage. Grooves 96 are provided in the peripheral rim and in the ribs 78 of the upper electrode 76. These grooves 96 are opposed to the grooves 38 and each contains an elongated knife 98. These knives 98 are preferably pivoted at one end, with the other end projecting through slots, not shown, formed in the outer upper clamping member and which mate with the slots 40 in the lower outer clamping member. Each knife is provided with a handle attached thereto or all the knives may be actuated by a single handle provided externally of the device. Ring-like filler members 100, made from material similar to that of the filler members 42, are rigidly positioned in all but the central pocket of the electrode 76. These filler members 100 have a contoured lower face formed as extensions of the lower faces of the buffer members 88 and determined by the configuration of the article. They are also provided with shoulders 102 to provide seats for the buffer members 88. In the central pocket is provided a filler member 104 having a diagonal vent opening 106.

The operation of the device is as follows:

The upper and lower mold sections are first withdrawn from each other and the strips 62 and 64, which have been placed against each other to exclude any air, therebetween, as by passing them through rollers or the like, are inserted between them. The strips may be of soft or hard plastic materials. If hard materials are used, it is advantageous to warm them prior to the filling step, such warming being accomplished either by passing them through hot gases, vapors or liquids or subjecting them to high frequency currents. They may also be softened by using hot filling material. In this way, even if softeners are required, it is possible to reduce the amount of necessary softeners substantially.

After the strips have been inserted, the outer clamping members are brought together until their peripheral rims meet. The inner electrodes are, at this time, still somewhat spaced from each other.

At this time, the filling nozzle 60, connected to a source of filling material, not shown, is brought up to the opening 58 and inserted therein in such manner that it pushes itself between the two superimposed strips. The filling material is then extruded between the sheets. Due to the filling pressure, the sheets expand until they take the shape determined by the contoured filler members. This forces the air present to escape through the respective vent openings. Thereafter the inner electrodes 22 and 76 are moved together for the small remaining distance and this movement clamps and encloses the filling material within the individual casings. The amount of excess filling material that is displaced by this small movement of the inner electrodes escapes through the overflow valve 65 and is conducted back to the source of filling material. The filling nozzle is then retracted and the outer clamping members may be slightly displaced from each other (although this is not necessary). At this point, the welding or sealing step takes place. The inner electrodes are moved together for a small distance corresponding to the depth of the welded seam to be made. The displacement of the filling material is compensated for at this time by the resilient buffers 88, the spring pressure against these buffers having been adjusted by means of the threaded insert 82. After the welding has taken place, the separation of the filled casing is effected by means of the knives 98. Although these knives have been illustrated as extending only in one direction whereby strips of joined casings such as shown at 108 in Fig. 3 are formed, it is within the scope of this invention to provide knives corresponding to the cross ribs as well as to the longitudinal ribs, whereby when both sets of knives are actuated each casing will be separated from all of the other casings formed. Preferably, one of such sets of knives would be pivoted to the top mold section and the other to the bottom mold section.

After the casings have been formed and separated, the molds are drawn away from each other and the finished articles removed. Such removal may be effected by automatic means, as for example a pair of grippers which automatically grasps a strip of filled casings at predetermined intervals and pulls it out of the device. Where the casings are completely separated from each other, as when two sets of knives are used, it is preferable to eject them from the device by a blast of compressed air through the vent openings.

The embodiment of the invention, heretofore described, has been concerned with the use of flat strips of casing material whereby the form of the casings is determined by the shape of the molds. However, an alternate arrangement should be to preform the strips into a series of pockets.

In yet another embodiment of the invention, the complete casings may be formed prior to the filling step by the application of highly compressed air. In this case, however, it would be necessary to evacuate the casings prior to filling in order to prevent undesirable air accumulating in the filled packages.

Obviously many modifications and variations of the present invention are possible in the light of the above teachings. It is, therefore, to be understood that within the scope of the appended claims the invention may be practiced otherwise than as specifically described.

What is claimed in this invention is:

1. Apparatus for packaging fluid substances in individually formed containers of thermoplastic material comprising a pair of hollow clamping members relatively movable toward and away from each other, each of said clamping members comprising a rear wall and side walls, the side walls of each of said clamping members being in substantial alignment with the corresponding side walls of the other clamping member to effect a clamping engagement therebetween upon movement of said clamping members toward each other, an opening in the rear wall of each of said clamping members, each opening being encompassed by a bearing, an individual shaft movable through each of said bearings, a housing connected to the inner end of each shaft, means connecting each of said housings to a source of electrical energy, each of said housings including a plurality of cells separated from each other by a gridwork formed by a plurality of intersecting ribs, the ribs of one housing extending toward and in alignment with the corresponding ribs of the other housing, and a notch on the outer edge of one of the side walls of each clamping member, said notches being constructed and arranged to combine with each other to form a filling opening for fluid substances when said clamping members are in clamping position, said filling opening being in the plane between the two housings.

2. The apparatus of claim 1 wherein each of the cells in each of said housings is provided with a contoured filler assembly, at least some of said filler assemblies comprising a filler member having a central aperture within which is resiliently positioned a contoured buffer member, said buffer members being each resiliently biased through its corresponding aperture toward the opposing housing but adapted to be moved in the opposite direction by the pressure of the fluid substances introduced through said filling opening, each of said buffer members having a surface contour to mate with the surface contour of its corresponding filler member.

3. The apparatus of claim 2 wherein vent openings are provided in each of said filler assemblies behind the contoured surface.

4. The apparatus of claim 1 wherein at least some of the ribs on each of said housings are provided with longitudinal slots, the slotted ribs in one housing corresponding in position to the slotted ribs on the other housing, the slots of one of said housings being each provided with a severing device movable into the corresponding slots of the other of said housings.

5. In combination, a package forming and molding device comprising a pair of hollow clamping members relatively movable toward and away from each other, each of said clamping members comprising a rear wall and side walls, the side walls of each of said clamping members being in substantial alignment with the corresponding side walls of the other clamping member to effect a clamping engagement therebetween upon movement of said clamping members toward each other, an opening in the rear wall of each of said clamping members, each opening being encompassed by a bearing, an individual shaft movable through each of said bearings, a housing connected to the inner end of each shaft, means connecting each of said housings to a source of electrical energy, each of said housings including a plurality of cells separated from each other by a gridwork formed by a plurality of intersecting ribs, the ribs of one housing extending toward and in alignment with the corresponding ribs of the other housing, and a notch on the outer edge of one of the side walls of each clamping member, said notches being constructed and arranged to combine with each other to form a filling opening for fluid substances when said clamping members are in clamping position, said filling opening being in the plane between the two housings, and a movable filling nozzle movable into and out of a position within said filling opening, said nozzle being connected to a source of fluid substances and having a relief valve means connected to said source, said valve means being normally closed but openable under the pressure of the fluid substances when said pressure exceeds a predetermined maximum, said nozzle being adapted to be moved into and out of said position within the filling opening in timed relationship with the movement of said molding device.

6. The apparatus of claim 4 wherein means are provided for removing the formed packages, said means being arranged to act in timed relation with the severing device.

References Cited in the file of this patent

UNITED STATES PATENTS

| | | |
|---|---|---|
| 777,744 | Paul | Dec. 20, 1904 |
| 1,552,741 | Hopkins et al. | Sept. 8, 1925 |
| 1,970,396 | Scherer | Aug. 14, 1934 |
| 1,986,422 | Zwoyer | Jan. 1, 1935 |
| 2,166,568 | Kuhlke | July 18, 1939 |
| 2,172,546 | Riel | Sept. 12, 1939 |
| 2,199,210 | Scherer | Apr. 30, 1940 |
| 2,494,484 | Nicolle | Jan. 10, 1950 |
| 2,497,212 | Donofrio | Feb. 14, 1950 |
| 2,530,400 | Rado | Nov. 1, 1950 |